United States Patent
Steinlechner

(10) Patent No.: US 7,694,561 B2
(45) Date of Patent: Apr. 13, 2010

(54) RATE-OF-TURN SENSOR

(75) Inventor: Siegbert Steinlechner, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 83 days.

(21) Appl. No.: 11/721,770

(22) PCT Filed: Jun. 14, 2006

(86) PCT No.: PCT/EP2006/063186

§ 371 (c)(1),
(2), (4) Date: Jun. 14, 2007

(87) PCT Pub. No.: WO2007/012520

PCT Pub. Date: Feb. 1, 2007

(65) Prior Publication Data

US 2009/0249875 A1   Oct. 8, 2009

(30) Foreign Application Priority Data

Jul. 26, 2005   (DE) ........................ 10 2005 034 703

(51) Int. Cl.
    *G01C 19/00* (2006.01)
(52) U.S. Cl. .................. 73/504.02; 73/504.12
(58) Field of Classification Search .............. 73/504.12, 73/504.02, 488, 494, 504.03, 504.08, 510, 73/514.02, 514.18; 340/671
    See application file for complete search history.

(56) References Cited

U.S. PATENT DOCUMENTS 5,600,064 A * 2/1997 Ward ........................ 73/504.04

(Continued)

FOREIGN PATENT DOCUMENTS

DE   102 37 411   7/2003

(Continued)

OTHER PUBLICATIONS

Gaisser ("New digital readout electronics for capacitive sensors by the example of micro-machined gyroscopes" Sensors and Actuators A 97098, 2002, pp. 557-562).*

(Continued)

*Primary Examiner*—Hezron Williams
*Assistant Examiner*—Samir M Shah
(74) *Attorney, Agent, or Firm*—Michael J. Striker

(57) ABSTRACT

A method for operation of and simultaneous analysis of a rate-of-turn sensor, comprising an oscillator element and a Coriolis element arranged on the oscillation element is disclosed, comprising the following method steps: generation of a digital operating signal with an excitation frequency corresponding to the resonant frequency of the oscillator element, digital to analogue conversion of the digital operating signal and operation of the oscillator element with the analogue operating signal, recording a Coriolis speed of the Coriolis element occurring about a normal to both oscillation axes due to the rotation of the rate-of-turn sensor with generation of an analogue Coriolis' signal proportional to the Coriolis speed, analogue-to-digital conversion of the analogue Coriolis signal, phase-sensitive multiplication of the digital Coriolis signal with the digital operating signal to form an intermediate signal, generation of a control signal proportional to the rate of turn of the rate-of-turn sensor from the intermediate signal, multiplication of the control signal with the digital operating signal to give a digital compensation signal in phase with the digital operating signal, digital-to-analogue conversion of the digital compensation signal to give an analogue compensation signal in phase with the analogue operating signal and subjecting the Coriolis element to the analogue compensation signal and output of the control signal.

12 Claims, 1 Drawing Sheet

U.S. PATENT DOCUMENTS

| | | | | |
|---|---|---|---|---|
| 5,672,949 A | * | 9/1997 | Ward | 318/609 |
| 5,945,599 A | * | 8/1999 | Fujiyoshi et al. | 73/504.12 |
| 6,067,858 A | * | 5/2000 | Clark et al. | 73/504.16 |
| 6,230,563 B1 | * | 5/2001 | Clark et al. | 73/504.04 |
| 6,370,937 B2 | * | 4/2002 | Hsu | 73/1.37 |
| 7,313,958 B2 | * | 1/2008 | Willig et al. | 73/504.12 |
| 2004/0123660 A1 | | 7/2004 | Willig et al. | |

FOREIGN PATENT DOCUMENTS

DE 102 37 410 8/2003

OTHER PUBLICATIONS

Gaisser et al: "New Digital Readout Electronics . . . " Sensors AMD Actuators A 97-98, 2002, pp. 557-562 (in English).

* cited by examiner

RATE-OF-TURN SENSOR

CROSS-REFERENCE TO A RELATED APPLICATION

The invention described and claimed hereinbelow is also described in German Patent Application DE 102005034703.7 filed on Jun. 14, 2006. This German Patent Application, whose subject matter is incorporated here by reference, provides the basis for a claim of priority of invention under 35 U.S.C. 119(a)-(d).

BACKGROUND OF THE INVENTION

The present invention relates to a method for driving and simultaneously evaluating a rate-of-turn sensor and a circuit design for carrying out the inventive method.

Micromechanical rate-of-turn sensors are used, e.g., in motor vehicles for the functionality of the electronic stability program, ESP, or for roll-tendency compensation. They use the Coriolis effect to measure, e.g., the rate-of-turn around the vertical axis or longitudinal axis of the motor vehicle.

Micromechanical rate-of-turn sensors contain one or more elastically suspended oscillator elements, which are stimulated to perform a periodic oscillating motion using driving forces F(t) that change periodically over time and are applied electrostatically. Simply speaking, the oscillator elements are elastically suspended masses m.

The plane in which the flat oscillator element lies is the x-y plane. When mass m that is swinging in the x direction is rotated around the z axis—which is normal to the x-y plane and which can be, e.g., the vertical axis of the vehicle—at a rate of turn $\Omega$, mass m undergoes additional periodic acceleration in the y direction, which is proportional to rate of turn $\Omega$. This acceleration is known as Coriolis acceleration. Special measuring devices are required to measure this acceleration, e.g., a second mass $m_c$, which is elastically coupled to a mass that is the oscillator element and which can oscillate in the y direction, and, e.g., two precision capacitor groups for measuring the course of oscillation in the y direction. This second mass is referred to below as Coriolis mass $m_c$. Simply speaking, Coriolis mass $m_c$ is a Coriolis element that is elastically located on the oscillator element. The oscillator element can undergo oscillations along a first axis of oscillation that represents the x axis; the Coriolis element can under oscillations along a second axis of oscillation that is normal to the first axis of oscillation and represents the y axis.

Sensors of this type are operated at the mechanical resonant frequency for the oscillator element that includes mass m, and for the Coriolis element that includes Coriolis mass $m_c$. To accomplish this, a suitable excitation frequency of driving force F(t) must be selected and/or controlled. At the resonant frequency, there is no phase shift between the rate of motion v(t) of mass m induced by driving force F(t), and driving force F(t). Likewise, in the resonance state, there is no phase shift between Coriolis velocity $v_c(t)$ of Coriolis mass $m_c$, and driving force F(t).

The motion of Coriolis mass $m_c$ can be evaluated directly using an "open loop" circuit design, or using a force negative feedback loop, which is also known as a closed loop. With force negative feedback, a controller ensures—via an electrostatic compensation force $F_c(t)$ that is also applied to Coriolis mass $m_c$—that Coriolis mass $m_c$ does not oscillate in the direction of the y axis and remains at rest in this direction, even when there is a rate of turn $\Omega$. In this case, force $F_c(t)$ to be applied is a measure of rate of turn $\Omega$.

A force negative feedback loop has the advantage that the evaluation bandwidth can be adjusted via the controller parameters, and errors resulting from non-linearities in the sensor, e.g., non-linear springs on Coriolis mass $m_c$, are greatly reduced.

FIG. 1 shows a block diagram with a rate-of-turn sensor DRS and a realization of force negative feedback according to the related art. The VCO/NCO (voltage/numerical controlled oscillator) block includes an oscillator that delivers the sinusoidal drive signal to generate driving force F(t) for the oscillator element with mass m. The frequency of the drive signal and, therefore, driving force F(t), is held at the resonant frequency of the oscillator element using a not-shown controller, and the amplitude of F(t) is stabilized by an amplitude regulator that regulates the amplitude of the drive signal. Rate-of-turn sensors with force negative feedback are known, e.g., from DE 102 37 410 A1 and DE 102 37 411 A1.

When the force negative feedback is realized such that the measured Coriolis velocity $v_c$ of Coriolis mass $m_c$ is provided via a control circuit at force input $F_c(t)$ on rate-of-turn sensor DRS (FIG. 1), problems arise in practical application. The controller must not have phase rotation at the resonant frequency. The controller must suppress interferences above and below the resonant frequency. These requirements can only be met, e.g., by using a bandpass of the second or higher order as the controller. To accomplish this, however, the bandpass must have its mid-frequency exactly at the oscillator resonant frequency. Since the oscillator resonant frequencies of the sensors are lot-dependent and sample-dependent, however, each bandpass would have to be calibrated individually, which is costly.

SUMMARY OF THE INVENTION

The disadvantages of the related art are prevented in an inventive method for driving and simultaneously evaluating a rate-of-turn sensor composed of at least one oscillator element capable of being made to oscillate along a first axis of oscillation, and of at least one Coriolis element located on the oscillator element such that it is capable of swinging along a second axis of oscillation that is normal to the first axis of oscillation, the method being composed of the following steps:

Generate a digital drive signal with an excitation frequency that corresponds to the resonant frequency of the oscillator element, Perform digital-analog conversion of the digital drive signal, and drive the oscillator element with the analog drive signal, Sense a Coriolis velocity of the Coriolis element generated by a rotation of the rate-of-turn sensor around an axis of rotation that is normal to both axes of oscillation, and generate an analog Coriolis signal that is proportional to the Coriolis velocity, Perform analog-digital conversion of the analog Coriolis signal to produce a digital Coriolis signal, Perform in-phase multiplication of the digital Coriolis signal with the digital drive signal to produce an intermediate signal that represents the short-time mean of the Coriolis velocity, Generate a control signal based on the intermediate signal, which is proportional to the rate of turn of the rate-of-turn sensor around the axis of rotation, Multiply the control signal with the digital drive signal to produce a digital compensation signal that is in-phase with the digital drive signal, Perform digital-analog conversion of the digital compensation signal to produce an analog compensation signal that is in-phase with the analog drive signal, and apply the analog compensation signal to the Coriolis element, to generate a compensation force—which is preferably generated electrostatically—that counteracts the Coriolis acceleration that causes the Coriolis velocity and acts on the Coriolis element, and Output the control signal.

In this context, "in-phase multiplication" means the phase angle of the digital drive signal is shifted—in order to be multiplied with the digital Coriolis signal—by a value corresponding to the time interval that is the sum of the times required to perform the digital-analog conversion of the digital drive signal to the analog drive signal and to perform the analog-digital conversion of the analog Coriolis signal to the digital Coriolis signal.

The inventive method prevents the disadvantages of the related art and provides a means for attaining the object of the present invention that has a technically simple design and requires no calibration. It is ensured in particular that, at the oscillator resonant frequency, the control always generates exactly one compensation signal with a phase rotation of zero compared with the drive signal. This is attained in particular by generating a digital compensation signal that is in-phase with the drive signal by multiplying the scalar control signal with the digital drive signal. In addition, the times required to convert the digital drive signal to the analog drive signal, and to convert the digital compensation signal to the analog compensation signal are identical; as a result, the analog compensation signal is in-phase with the analog drive signal. The inventive method makes it possible, in particular, to use digital circuit technology—which is inexpensive to manufacture—to attain force negative feedback in a rate-of-turn sensor. The inventive method therefore makes it possible to realize a linear negative force feedback of the forces caused by the Coriolis effect on the Coriolis mass in a micromechanical rate-of-turn sensor. In addition, a measured quantity is provided that is proportional to the outer rate of rotation.

According to an advantageous embodiment of the inventive method, in order to perform in-phase multiplication of the digital Coriolis signal with the digital drive signal, the digital drive signal is delivered for multiplication such that it is delayed by a time interval that is the sum of the time required for the digital-analog conversion of the digital drive signal to the analog drive signal, and for the analog-digital conversion of the analog Coriolis signal to the digital Coriolis signal.

Before the control signal is generated, the frequencies that exceed the excitation frequency of the drive signal are advantageously filtered out of the intermediate signal, e.g., using a low-pass filter. To this end, the intermediate signal is sent through a low-pass filter. It is also feasible, in principle, to first generate the control signal and to then send the control signal through a low-pass filter. The low-pass filtration serves essentially to suppress the doubled excitation frequency produced via multiplication. It is also feasible to reduce the control signal to a desired bandwidth before outputting the control signal, which is proportional to the rate of turn, e.g., on a display device or a control device of a driving assistance device. This can take place, e.g., using a low-pass filter that filters frequency components out of the control signal before it is output. The control signal is preferably generated via the weighted addition of the intermediate signal and integrating the intermediate signal over time.

An advantageous embodiment of the present invention provides a circuit design for carrying out the inventive method, which includes Means for generating a digital drive signal with an excitation frequency that corresponds to the resonant frequency of an oscillator element of a rate-of-turn sensor, Means for carrying out digital-analog conversion of the digital drive signal to produce an analog drive signal to drive the oscillator element of the rate-of-turn sensor, Means for sensing a Coriolis velocity of a Coriolis element generated by a rotation of the rate-of-turn sensor, and for generating an analog Coriolis signal that is proportional to the Coriolis velocity, Means for performing analog-digital conversion of the analog Coriolis signal to produce a digital Coriolis signal, Means for in-phase multiplying the digital drive signal with the Coriolis signal to produce an intermediate signal that represents the short-time mean of the Coriolis velocity, Means for generating a control signal based on the intermediate signal, which is proportional to the rate of turn of the rate-of-turn sensor around the axis of rotation, Means for multiplying the control signal with the digital drive signal to produce a digital compensation signal that is in-phase with the digital drive signal, Means for performing the digital-analog conversion of the digital compensation signal to produce an analog compensation signal that is in-phase with the analog drive signal, and application of the analog compensation signal on the Coriolis element, to generate an electrostatic compensation force that counteracts the Coriolis acceleration that causes the Coriolis velocity and acts on the Coriolis element, and Means for outputting the control signal.

The inventive circuit design preferably also includes means for performing the low-pass filtering of the intermediate signal. The low-pass filtration serves essentially to suppress the doubled excitation frequency produced by multiplying the Coriolis signal with the drive signal.

According to an advantageous embodiment of the inventive circuit design, it is provided that the means for producing a control signal that is proportional to the rate of turn of the rotation of the rate-of-turn sensor around the axis of rotation includes means for summing the intermediate signal in a weighted manner and integrating the intermediate signal over time. The integral of the intermediate signal over time is added to the intermediate signal. The means for performing the weighted addition of the intermediate signal and the integral of the intermediate signal over time preferably include a proportional integral controller.

According to a further advantageous embodiment of the inventive circuit design, it is provided that the means for in-phase multiplying the digital drive signal with the digitized Coriolis signal include a time-delay unit that delays the digital drive signal to be delivered for multiplication by a time interval that is the sum of the time required to convert the digital drive signal to the analog drive signal, and to convert the analog Coriolis signal to the digital Coriolis signal in the particular digital-analog and analog-digital converters. A low-pass filter can be located between the means for in-phase multiplying the digital drive signal with the digital Coriolis signal and the means for generating a control signal that is proportional to the rate of turn of the rotation of the rate-of-turn sensor around the axis of rotation, to filter frequencies that exceed the excitation frequency of the drive signal out of the intermediate signal before the control signal is generated. The means for outputting the control signal can also include a low-pass filter which is suitable for adjusting the control signal to a desired bandwidth. With the inventive method and the inventive circuit design, it is basically feasible for the Coriolis signal to be output digitally by the rate-of-turn sensor. In this case, the means for digitizing the Coriolis signal are located in the rate-of-turn sensor.

DESCRIPTION OF THE PREFERRED EMBODIMENTS

Figure 1:
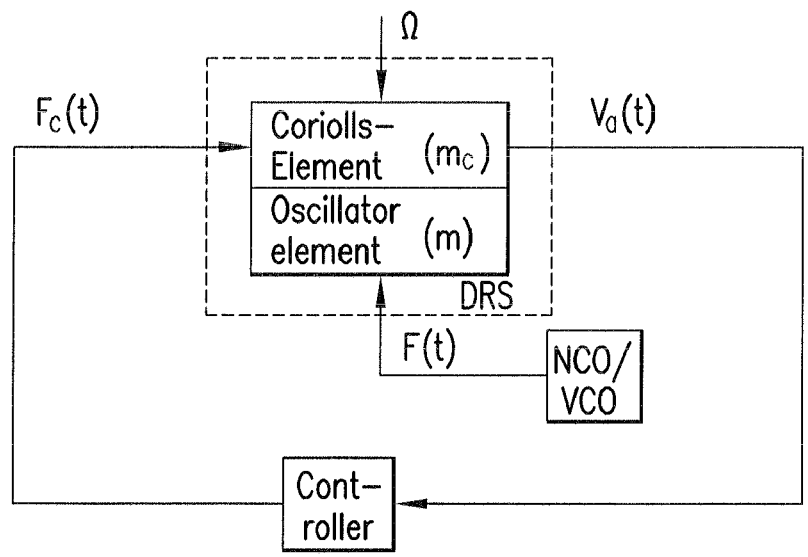
FIG. 1 a circuit design for the force negative feedback of the Coriolis element of a rate-of-turn sensor according to the related art, and FIG. 2 an inventive circuit design for simultaneously driving and evaluating a rate-of-turn sensor.
Figure 2:
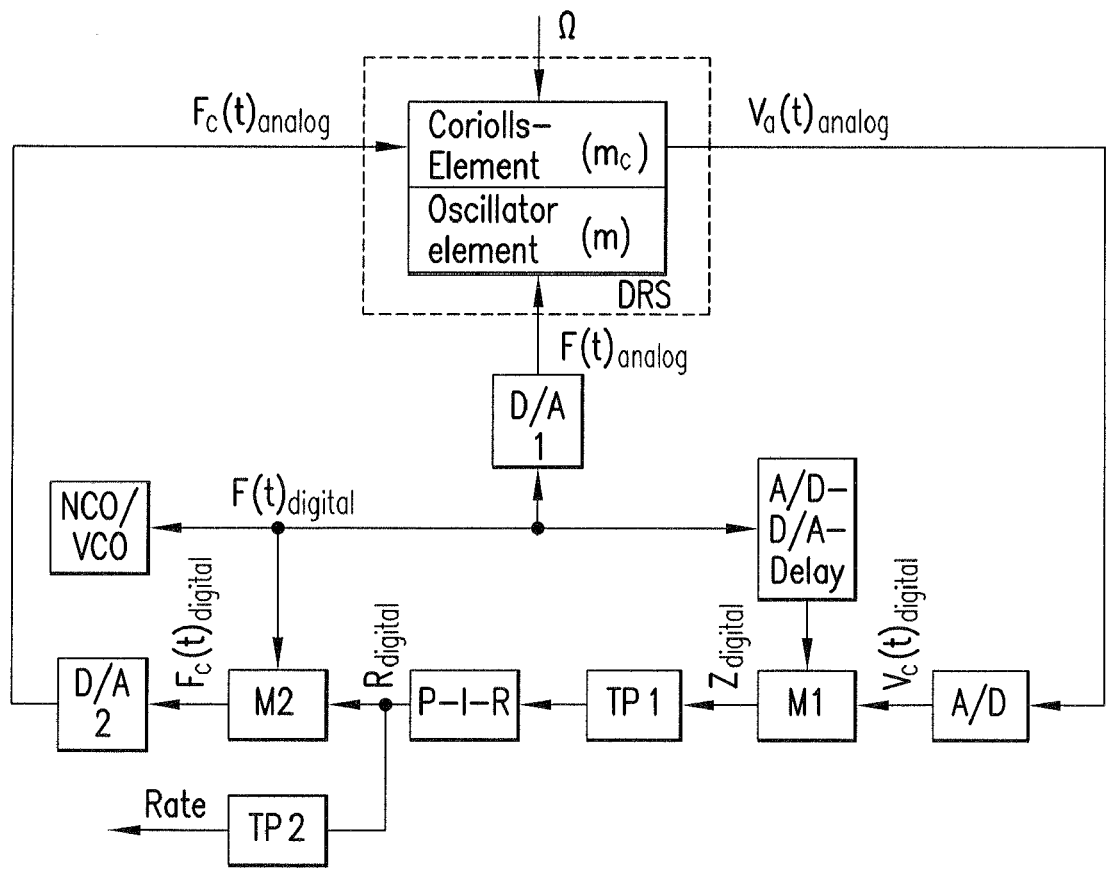

An inventive circuit design is shown in FIG. 2. For simplicity, the drive signal that generates the drive force for driving the oscillator element is referred to below as F(t). The compensation signal, which brings about a force in the rate-of-turn sensor DRS that counteracts the Coriolis acceleration of the Coriolis element, is referred to below as $F_c(t)$. In addition, the Coriolis signal is referred to as $v_c(t)$ for simplicity. The indices "analog" and "digital" indicate the form in which the particular signal is present at the particular point. In FIG. 2, the VCO/NCO block is an oscillator that can be controlled in terms of frequency and amplitude, and which delivers a digital, sinusoidal drive signal $F(t)_{digital}$ to generate the drive force for mass m, which is the oscillator element. The DRS block contains the actual micromechanical sensor and the circuits required to realize a linear, analog correlation between the input signals $F(t)_{analog}$, $F_c(t)_{analog}$ and the corresponding forces on mass m and Coriolis mass $m_c$. The DRS block also includes a circuit that delivers an analog Coriolis signal $v_c(t)_{analog}$ that is proportional to the instantaneous Coriolis velocity of Coriolis mass $m_c$.

First, analog Coriolis signal $v_c(t)_{analog}$ undergoes A/D conversion and is in-phase multiplied with the delayed, digital drive signal $F(t)_{digital}$ using a multiplier M-1. Digital drive signal $F(t)_{digital}$ is delayed in a time-delay unit A/D-D/A-Delay. The delay in time-delay unit A/D-D/A-Delay is dimensioned such that it corresponds to the sum of the conversion times of the analog-digital converter A/D and digital-analog-converter D/A-1 or D/A-2 that are used. Digital drive signal $F(t)_{digital}$ is therefore delayed—before it is multiplied with the analog-digitally converted, analog Coriolis signal $v_c(t)_{analog}$—by exactly the sum of the time required to convert digital drive signal $F(t)_{digital}$ in digital-analog converter D/A-1 to analog drive signal $F(t)_{analog}$, and the time required to convert the analog Coriolis signal $v_c(t)_{analog}$ to digital Coriolis signal $v_c(t)_{digital}$ in analog-digital converter A/D. Digital-analog converters D/A-1 and D/A-2 have the same conversion time.

The doubled oscillator frequency is suppressed via the filtering—carried out downstream of multiplier M-1—through low-pass TP-1 with a limiting frequency of, e.g., 1 kHz. An intermediate signal $Z_{digital}$ is generated that is proportional to the short-time mean of the instantaneous amplitude of the Coriolis signal $v_c(t)$. This intermediate signal $Z_{digital}$ is now directed to a controller P-I-R, which preferably includes a proportional integral controller and has the task of regulating Coriolis signal $v_c(t)$ as close to zero as possible. Controller P-I-R provides, at its output, a control signal $R_{digital}$ that is proportional to rate of turn $\Omega$ of a rotation of rate-of-turn sensor DRS around an axis of rotation that is normal to the axes of oscillation of the oscillator element and the Coriolis element. The output of controller P-I-R is connected with a further multiplier M-2, which multiplies control signal $R_{digital}$ produced by controller P-I-R with digital drive signal $F(t)_{digital}$ to produce a digital compensation signal $F_c(t)_{digital}$. Since scalar control signal $R_{digital}$—which defines a mean of the Coriolis signal $v_c(t)$—is multiplied with digital drive signal $F(t)_{digital}$, a digital compensation signal $F_c(t)_{digital}$ that is in-phase with digital drive signal $F(t)_{digital}$ is obtained. After digital compensation signal $F_c(t)_{digital}$ is converted to an analog compensation signal $F_c(t)_{analog}$ using digital-analog converter D/A-2, analog compensation signal $F_c(t)_{analog}$ reaches the force negative feedback input of rate-of-turn sensor DRS.

Since digital-analog-converters D/A-1 and D/A-2 have the same conversion times, analog compensation signal $F_c(t)_{analog}$ is also in-phase with analog drive signal $F(t)_{analog}$.

At the same time, control signal $R_{digital}$ present at the output of controller P-I-R is sent to a low-pass filter TP-2, where the bandwidth of control signal $R_{digital}$ is reduced to a required value of, e.g., 50 Hz. The output of the low-pass filter delivers a signal that is proportional to rate of turn $\Omega$.

With the inventive method, analog drive signal $F(t)_{analog}$ used to produce the drive force, and compensation signal $F_c(t)_{analog}$ provided to produce the compensation force are always in-phase with each other, which is not the case with the types of force negative feedback used in the related art. This is attained by first producing scalar control signal $R_{digital}$—which defines a short-time mean—by in-phase multiplying digital Coriolis signal $v_c(t)_{digital}$ with digital drive signal $F(t)_{digital}$, in which case the phase angle of digital drive signal $F(t)_{digital}$ is shifted—in order to be multiplied with digital Coriolis signal $v_c(t)_{digital}$—by a value corresponding to the time interval that is the sum of the time required to perform digital-analog conversion of digital drive signal $F(t)_{digital}$ to analog drive signal $F(t)_{analog}$ and to perform analog-digital conversion of analog Coriolis signal $v_c(t)_{analog}$ to digital Coriolis signal $v_c(t)_{digital}$. Scalar control signal $R_{digital}$ is then multiplied with digital drive signal $F(t)_{digital}$, thereby producing digital compensation signal $F_c(t)_{digital}$, which is in-phase with digital drive signal $F(t)_{digital}$. Since the times required to convert digital drive signal $F(t)_{digital}$ to analog drive signal $F(t)_{analog}$ are identical to the times required to convert digital compensation signal $F_c(t)_{digital}$ to analog compensation signal $F_c(t)_{analog}$, analog compensation signal $F_c(t)_{analog}$ is in-phase with analog drive signal $F(t)_{analog}$.

It is important to note that proportional integral controller P-I-R and low-pass filter TP1 in FIG. 2 can also be located in the reverse order.

INDUSTRIAL APPLICABILITY

The present invention has industrial applicability, in particular, in the field of manufacturing and operating rate-of-turn sensors, e.g., for use in motor vehicles. The present invention is suited, e.g., for the cost-favorable and exact evaluation of rate-of-turn sensors for ESP, roll-tendency compensation, and navigation.

What is claimed is:

1. A method for driving and simultaneously evaluating a rate-of-turn sensor having at least one oscillator element oscillating along a first axis of oscillation, and at least one Coriolis element located on the oscillator element and swinging along a second axis of oscillation, the second axis being normal to the first axis, the method comprising the steps of:

generating a digital drive signal with an excitation frequency that corresponds to a resonant frequency of the oscillator element;

performing digital-analog conversion of a digital drive signal to produce an analog drive signal, and driving the oscillator element with the analog drive signal;

sensing a Coriolis velocity of the Coriolis element generated by a rotation of the rate-of-turn sensor around a third axis of rotation that is normal to both the first and second axes, and generating an analog Coriolis signal that is proportional to the Coriolis velocity;

performing analog-digital conversion of the analog Coriolis signal to produce a digital Coriolis signal;

in-phase multiplying the digital Coriolis signal with the digital drive signal to produce an intermediate signal;

generating a control signal based on the intermediate signal, which is proportional to a rate of turn of the rate-of-turn sensor;

multiplying the control signal with the digital drive signal to produce a digital compensation signal that is in-phase with the digital drive signal;

performing digital-analog conversion of the digital compensation signal to produce an analog compensation signal that is in-phase with the analog drive signal, and applying the analog compensation signal to the Coriolis element; and outputting a control signal.

2. The method as recited in claim 1,
wherein,
in order to in-phase multiply the digital Coriolis signal with the digital drive signal, the digital drive signal is delivered for multiplication such that it is delayed by a time interval that is a sum of a time required to convert the digital drive to the analog drive signal, and to convert the analog Coriolis signal to the digital Coriolis signal.

3. The method as recited in claim 1,
wherein,
before the control signal is generated, frequencies that exceed an excitation frequency of the drive signal are filtered out of the intermediate signal.

4. The method as recited in claim 1,
wherein
the control signal is reduced to a desired bandwidth before it is output.

5. The method as recited in claim 1,
wherein
the control signal is generated via weighted addition of the intermediate signal and an integral of the intermediate signal over time.

6. A circuit design for driving and simultaneously evaluating a rate-of-turn sensor having at least one oscillator element oscillating along a first axis of oscillation, and at least one Coriolis element located on the oscillator element and swinging along a second axis of oscillation, the second axis being normal to the first axis, comprising:

means for generating a digital drive signal with an excitation frequency that corresponds to a resonant frequency of the oscillator element;

means for carrying out digital-analog conversion of the digital drive signal to produce an analog drive signal to drive the oscillator element;

means for sensing a Coriolis velocity of the Coriolis element generated by a rotation of the rate-of-turn sensor around a third axis being normal to the first and second axes, and for generating an analog Coriolis signal that is proportional to the Coriolis velocity;

means for performing analog-digital conversion of the analog Coriolis signal to produce a digital Coriolis signal;

means for in-phase multiplying the digital drive signal with the Coriolis signal to produce an intermediate signal;

means for generating a control signal based on the intermediate signal, which is proportional to a rate of turn of the rate-of-turn sensor;

means for multiplying the control signal with the digital drive signal to produce a digital compensation signal that is in-phase with the digital drive signal;

means for performing digital-analog conversion of the digital compensation signal to produce an analog compensation signal that is in-phase with the analog drive signal, and for applying the analog compensation signal to the Coriolis element; and means for outputting a control signal.

7. The circuit design as recited in claim 6, wherein the control signal is proportional to the rate of turn of the rate-of-turn sensor and the means for generating the control signal include means for integrating the intermediate signal over time.

8. The circuit design as recited in claim 7,
wherein
the means for integrating the intermediate signal over time include a proportional integral controller.

9. The circuit design as recited in claim 6,
wherein
the means for in-phase multiplying the digital drive signal with the digitized Coriolis signal include a time-delay unit that delays the digital drive signal to be delivered for multiplication by a time interval that is the sum of the time required to convert the digital drive signal to the analog drive signal, and to convert the analog Coriolis signal to the digital Coriolis signal.

10. The circuit design as recited in claim 6
wherein
a low-pass filter is located between the means for in-phase multiplying the digital drive signal with the digital Coriolis signal and the means for generating a control signal that is proportional to the rate of turn of the rate-of-turn sensor.

11. The circuit design as recited in claim 6,
wherein
the means for outputting the control signal include a low-pass filter.

12. The circuit design as recited in claim 6, further comprising means for low-pass filtering the intermediate signal.

* * * * *